United States Patent [19]

Kirk

[11] Patent Number: 4,746,136
[45] Date of Patent: May 24, 1988

[54] BICYCLE FRAME AND BICYCLE

[76] Inventor: Francis G. Kirk, 12, Kenworthy Road, Braintree, Essex, England

[21] Appl. No.: 945,673

[22] PCT Filed: Mar. 10, 1986

[86] PCT No.: PCT/GB86/00132
§ 371 Date: Nov. 19, 1986
§ 102(e) Date: Nov. 19, 1986

[87] PCT Pub. No.: WO86/05458
PCT Pub. Date: Sep. 25, 1986

[30] Foreign Application Priority Data

Mar. 20, 1985 [GB] United Kingdom ............... 8507166
Aug. 14, 1985 [GB] United Kingdom ............... 8520379

[51] Int. Cl.⁴ .................. B62K 19/12; B62K 19/02
[52] U.S. Cl. .................................................. 280/281 R
[58] Field of Search ....... 280/281 R, 281 LP, 281 W, 280/281 B, 282, 279, 276, 278, 287

[56] References Cited

U.S. PATENT DOCUMENTS 594,136 11/1897 Hill .................................. 280/281 R
4,550,927 11/1985 Resele ............................. 280/281 R

FOREIGN PATENT DOCUMENTS

EP102347 3/1984 European Pat. Off. ........ 280/281 R
669766 11/1929 France .
2265602 10/1975 France .
292767 6/1928 United Kingdom .
575144 2/1946 United Kingdom ............ 280/281 R
2136745 9/1984 United Kingdom ............ 280/281 R Primary Examiner—John A. Pekar
Attorney, Agent, or Firm—Toren, McGeady & Associates

[57] ABSTRACT

A bicycle frame includes a saddle stem (3) and a head (4) interconnected by upper (1) and lower (2) bars and integrally cast in a lightweight metal or alloy, particularly magnesium. At least the lower bar (2), and preferably also the saddle stem (3) is cast in an open section which is subsequently closed by means of a second casting (33,36) secured in the open section by adhesive and preferably also mechanically interlocked therewith. The mechanical interlocking is provided by interengaging elements (41, 42, 43) arranged at an angle oblique to the length of the castings. The upper (1) and lower (2) bars are joined by a structural bridge (31) linking them at a location between the head (94) and the saddle stem (3). The lower bar (2) joins the saddle stem (3) at an intermediate point.

3 Claims, 2 Drawing Sheets

BICYCLE FRAME AND BICYCLE

This invention relates to bicycle frames.

A conventional bicycle frame is basically of steel or alloy tubing and consists of a saddle tube or stem and a head which are joined by a lower bar and an upper bar. The upper bar may be generally horizontal, as in a man's bicycle, in which case it is known as a cross bar, or it may be oblique and generally parallel with the lower bar, as in a lady's bicycle. The head carries a bearing for an assembly of front forks and handlebar, while rear forks are carried by the saddle stem.

My published United Kingdom patent application No. 2136745 relates to bicycle frames cast in a lightweight metal or alloy, such as magnesium or an alloy thereof.

In accordance with the invention of the above-mentioned published application, the frame has parts cast, particularly in open section, from a lightweight metal or alloy, and the open section upper and lower bars are joined by a structural bridge linking them at a location between the head and the saddle stem.

The bridge, which may be of I section, has the effect of considerably increasing the torsional stiffness of the frame, which enables the use of cast magnesium, which has comparatively low torsional stiffness when compared with the steels used for bicycle frames, for the upper and lower bars. The greatest torsional stresses are applied to the lower bar, which connects the saddle stem to the head, and therefore has to react the effort applied to the pedals and to the handlebar.

I have discovered that while the use of I or other open section for the cast frame parts, is satisfactory for most of the components, considerable advantages accrue from using a two part casting, especially for the highly stressed lower bar, so as to enable the closure of the section. Closure of the section is also advantageous for the saddle stem.

In accordance with a first aspect of the present invention, there is provided a bicycle frame including a saddle stem and a head interconnected by upper and lower bars, in which at least the saddle stem and the upper and lower bars are integrally cast in a lightweight metal or alloy, in which at least the lower bar is cast in an open section which is closed by means of a second casting secured to the open section.

As in the above-mentioned published application, the upper and lower bars are preferably joined by an integrally cast structural bridge, which may be of I section, linking them at a location between the head and the saddle stem.

The second casting is preferably secured to the open section by means of an ultra-strong adhesive, which may be stoved to complete the hardening.

In a preferred form the lower bar is cast originally in a C section, and the second casting is a complementary C section received within the original casting.

In the above mentioned published application, the saddle stem is described as being of V section, and this may also be closed by an additional casting, e.g. of a C section, to enter the wide end of the V.

In a further United Kingdom application, which is to be published under No. GB-A-2164300, the lower bar may join the saddle tube or stem at an intermediate point so that the axis of the lower bar passes substantially through the axis of the rear wheel, thus transmitting the stresses in the most satisfactory manner.

In use, a bicycle frame is subject to cyclic flexing as effort is applied to the pedals, and different sets of stresses, and their accompanying strains, occur during cornering. In order to absorb these stresses the adhesive used to join the two castings together has to meet exacting requirements, and it has been found that by providing some mechanical interlocking between the castings, the requirements of the adhesive may be reduced.

Accordingly, in accordance with a preferred form of the invention, the second casting is mechanically interlocked with the open section casting and is also secured by adhesive.

Preferably, the mechanical interlocking is provided by interengaging elements, conveniently cast-in projections and recesses on the castings, arranged at an angle oblique to the length of the castings. Alternatively, pins secured by adhesive in matching apertures may be used.

By using an oblique arrangement, the mechanical interlock can absorb stresses both longitudinally of the castings and also in a direction tending to separate the castings.

In accordance with a second aspect of the invention, there is provided a bicycle incorporating a bicycle frame in accordance with the invention as set forth above.

The invention will be further described with reference to the accompanying drawings, which show a preferred embodiment of the present invention, and in which.

Figure 1:
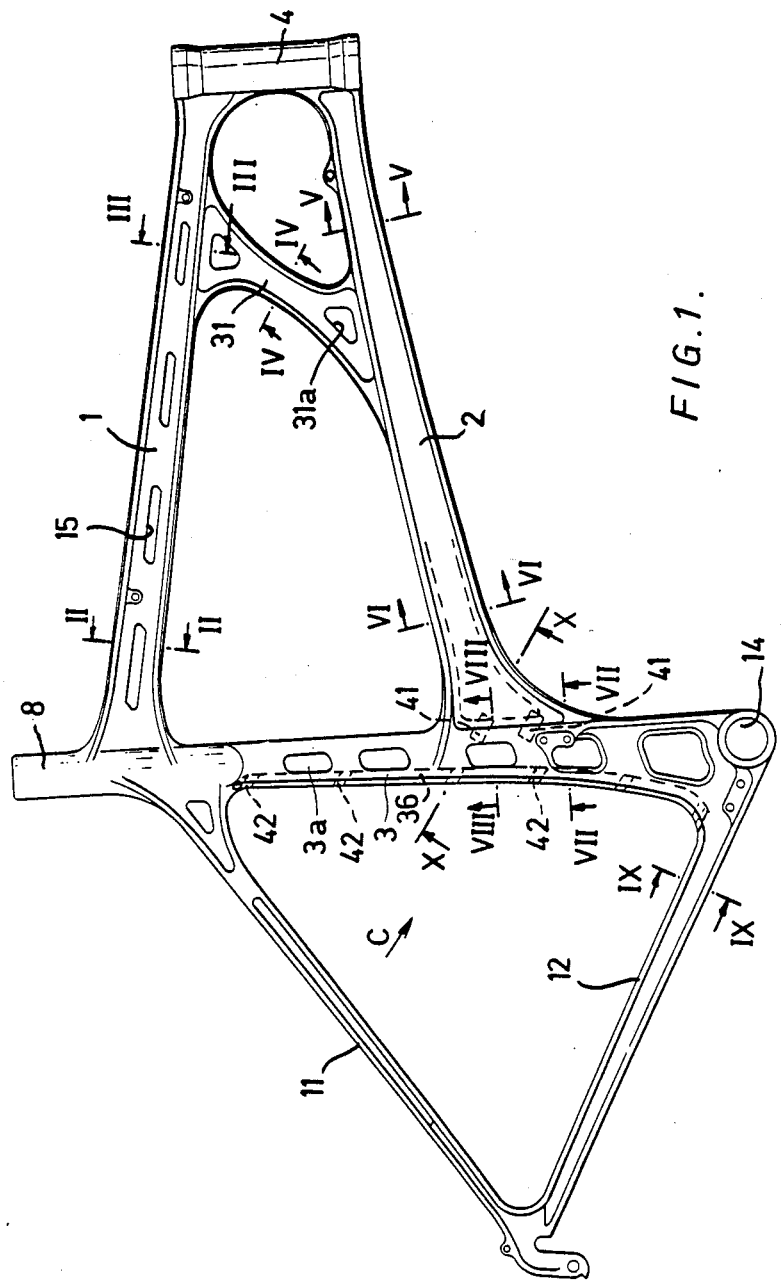
FIG. 1 is an elevation of a bicycle frame in accordance with a presently preferred form of the invention.

The bicycle frame illustrated in FIG. 1 has a top or cross bar 1, a lower bar 2, a saddle stem 3, and a tubular head 4. The head 4 carries a bearing for an assembly (not shown) of a handlebar and a front fork to support a front wheel in a generally conventional manner. It will be noted that the cross bar 1 is generally horizontal in use, and that the cross bar 1 and lower bar 2 diverge in a rearward direction.

The saddle stem 3 has an upper tubular portion 8 to receive a support tube for a saddle. In addition, the saddle stem 3 carries a rear fork arrangement, consisting of pairs of upper and lower rear forks 11 and 12 respectively, to support a rear wheel.

At the lower end of the saddle stem 3 there is located a journal 14 for the conventional crank wheel and pedals (not shown).

In the arrangement illustrated, the cross bar 1, part of the lower bar 2, a bridge 31, the saddle stem 3, and the rear forks 11 and 12 are cast in one piece from a commercial grade of magnesium, e.g. that known as L 128, or a magnesium-based alloy, and have the sections as illustrated in FIGS. 2 to 10.

An important feature of the frame as illustrated is the additional stiffening of the frame against torsion by means of the structural bridge, which is illustrated by the reference numeral 31 in FIG. 1 and extends between the cross bar 1 and the lower bar 2. The bridge is cast solid with the cross bar 1 and part of lower bar 2 and acts as a torsion arm so that any twisting of the frame due to deflection of the head 4 out of the plane of the frame is not resisted by the ends of the cross bar 1 and lower bar 2 remote from the saddle stem 3, but at locations considerably nearer the saddle stem 3.

Figure 2:
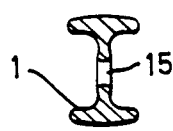
FIGS. 2 to 10 are respectively sections taken along the lines II—II, III—III, IV—IV, V—V, VI—VI, VII—VII, VIII—VIII, IX—IX and X—X of FIG. 1.
Figure 3:
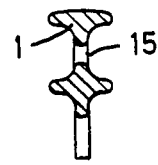
Figure 4:
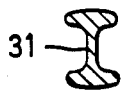

The cross bar 1 is of I section as shown in FIG. 2, and also has lightening holes 15. FIG. 3 illustrates the section at the junction between the cross bar 1 and the bridge 31. The bridge 31 also has lightening holes 31a and is of I section as shown in FIG. 4.

Figure 5:
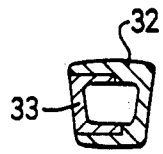
Figure 6:
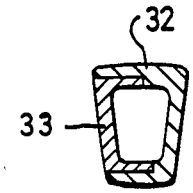

FIGS. 5 and 6 show that the lower bar 2 is formed as a two-piece casting. A large C section casting 32 is cast solid with the top bar 1, the saddle stem 3 and the head 4. A second smaller C section casting 33 is received within the open side of the casting 32 as shown, and is secured with an ultra-high strength adhesive, which is subsequently stoved to harden it.

Figure 7:
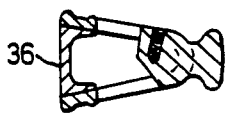
Figure 8:
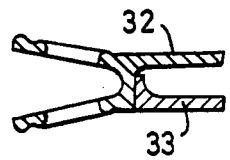

FIGS. 7 and 8 illustrate the section of the saddle stem 3 as being of generally V section, merging into (or having inset) the tubular portion 8 to receive the saddle support tube, which is clampable, by means of slots (not shown) in the tubular portion 8, as is conventional.

FIG. 7 shows how the V section may be closed, if desired, by a C section casting forming a panel or insert 36, also secured by ultra-strong adhesive, stoved if required. FIG. 8 also illustrates the two casting parts 32 and 33 of the lower bar 2.

Figure 9:
Figure 10:
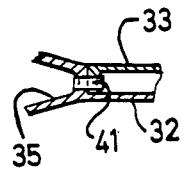

FIG. 9 shows that each of the rear forks 12 is of C section. The forks 11 are similar. As is conventional, the arrangement includes two upper and lower rear forks 12, one on each side of the rear wheel 13. The C sections are arranged back to back so that the open sections face outwardly.

The head 4 may be integral casting of tubular form.

The effect of the bridge 31 is to decrease the effective resisting length of the beams formed by the cross bar 1 and lower bar 2. Since torsional and bending resistance are inversely proportional to the length of a beam, both the beams formed by the bars 1 and 2 are made considerably stiffer in bending and torsion by the effective shortening created by the bridge 31. Also significant is that the increased length of torque arm across the stiff bridge creates large bending deflections in both the beams 1 and 2 for unit angular deflection of the head. This makes the torsional stiffness of the beams 1 and 2 less significant and the bending stiffness more significant. All these effects enable beams cast in a material with a low modulus of rigidity compared with steel, such as magnesium, and which are stiff in bending and relatively weak in torsion, to give a torsionally rigid structure in the frame described. Conventional bicycles use steel tubes which have high torsional rigidity and relatively low bending stiffness which is limited by the section stability, creating frame stiffness mainly by the torsional rigidity of the tubes.

The junction of the lower bar 2 with the saddle stem 3 is displaced upwardly from the lower end of the saddle stem 3 as illustrated in FIG. 1. By this means, the overall length of the lower bar 2 is reduced, thereby further reducing of the length of the beam it forms, and also saving material and therefore weight. In addition, there is some reinforcement of the saddle stem 3 itself.

It has been found that by using the closed C section configuration for the lower bar 2, the greater torsional strength requirements for this bar, as compared with the cross bar 1, may be met without the use of excessive amounts of metal.

As an example, the thickness of the metal forming the various sections of the frame may be 5 mm, although a smaller thickness than this may be found to be practicable.

In order to provide some mechanical interlock between the large C section casting 32 and the second closure casting 33, so as to reduce the mechanical requirements of the adhesive, they are provided, in the region of the junction between the lower bar 2 and the saddle stem 3, with a pair of obliquely extending pins or keys 41 (see also FIG. 10) engaged in matching apertures and secured by an ultra-strong adhesive. These pins or keys 41 are introduced via the open V section 35 of the saddle stem 3, prior to closure of this section by the insert or panel 36.

Figures 11, 12:
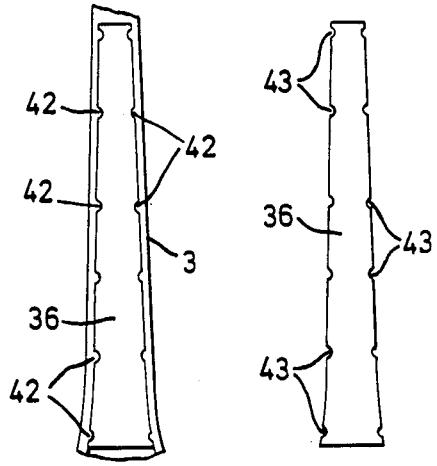
FIG. 11 is a view taken on the arrow C of FIG. 1 showing an insert in the saddle stem.
FIG. 12 is an elevation, similar to FIG. 11, but showing the insert in isolation.

FIGS. 11 and 12 show how a series of cast-in oblique ribs 42, formed adjacent the open end of the V section 35 of the saddle stem 4, co-operate with a series of marginal notches or recesses 43 on the edges of the panel or casting 36. This provided mechanical interconnection between the section 35 and the closure panel 36, again to reduce the stress on the adhesive.

The oblique location of the pins 41 and the ribs 42 is illustrated in FIG. 1.

The oblique nature of the mechanical interconnection is intended to provide interlocking against stresses both along and normal to the castings.

Various modifications may be made within the scope of the invention.

What is claimed is:

1. A bicycle frame including a saddle stem and a head interconnected by upper and lower bars, in which at least the saddle stem, the upper bar and part of the lower bar are integrally cast in a lightweight metal or alloy, characterised in that at least one element of the frame is cast in an open section which is subsequently closed by means of a second casting secured in the open section.

2. A bicycle frame according to claim 1, characterised in that it is cast in magnesium.

3. A bicycle frame according to claim 1, characterised in that the saddle stem is cast in V section and is closed by a C section casting placed in the open wide end of the V.

* * * * *